United States Patent [19]

Sasaki et al.

[11] Patent Number: 5,481,547

[45] Date of Patent: Jan. 2, 1996

[54] SDH RADIO COMMUNICATION SYSTEM AND TRANSMITTER/RECEIVER EQUIPMENT THEREFOR

[75] Inventors: Katsuhiro Sasaki; Yuka Kuroda; Seiji Fukuda, all of Tokyo, Japan

[73] Assignee: NEC Corporation, Japan

[21] Appl. No.: 68,970

[22] Filed: May 28, 1993

[30] Foreign Application Priority Data

May 29, 1992 [JP] Japan .................................. 4-137409

[51] Int. Cl.[6] ........................................................ H04J 3/04
[52] U.S. Cl. ........................................... 370/112; 370/102
[58] Field of Search .................................. 370/84, 110.1, 370/112, 102, 105.1, 105.5

[56] References Cited

U.S. PATENT DOCUMENTS

| | | | |
|---|---|---|---|
| 4,215,245 | 7/1980 | Bellisio | 370/84 |
| 4,542,500 | 9/1985 | Jean-Claude | 370/102 |
| 4,606,042 | 8/1986 | Kahn et al. | 380/37 |
| 4,807,221 | 2/1989 | Stummer | 370/102 |
| 5,091,907 | 2/1992 | Wettengel | 370/84 |
| 5,195,088 | 3/1993 | Urbanski | 370/84 |
| 5,241,543 | 8/1993 | Amada et al. | 370/102 |

FOREIGN PATENT DOCUMENTS 0107175  5/1984  European Pat. Off. .
4-212538  8/1992  Japan .

OTHER PUBLICATIONS

NTT Network Systems Development Center: 1989 IEEE, Hirofumi Ichikawa et al, pp. 1297–1302, "Digital Radio System Design with the Network Node Interface".
IEEE International Conference on Communications ICC '90, vol. 1, 15 Apr. 1990, Atlanta, U.S., pp. 81–87 XP147382, G. D. Richman et al. 'Transmission of Synchronous Digital Hierarchy Signals by Radio'.

*Primary Examiner*—Douglas W. Olms
*Assistant Examiner*—Ajit Patel
*Attorney, Agent, or Firm*—Ostrolenk, Faber, Gerb & Soffen

[57] ABSTRACT

With the assumption of the bit number of one frame of a synchronous transport module to be S and the bit number of one radio frame in radio communication to be M, the bit number M of the radio frame is set to satisfy a relation S=K.M (K is a natural number other than 0). Hereby, the circuit construction of a SDH radio communiaction transmitter/receiver equipment is simplified and power consumption is reduced. In the case where a radio intermediate switching station is installed, the circuit construction of the intermediate station is simplified and power consumptuion is reduced.

11 Claims, 5 Drawing Sheets

SDH RADIO COMMUNICATION SYSTEM AND TRANSMITTER/RECEIVER EQUIPMENT THEREFOR

BACKGROUND OF THE INVENTION

1. Field of the Invention

The present invention relates to an SDH (Synchronous Digital Hierarchy) radio communication a system and transmitter/receiver equipment therefor.

2. Description of the Prior Art

With recent expansion of worldwide digital communication networks, CCITT (International Telegraph and Telephone Consultative Committee), recommends an SDH rule to hierarchically multiplex channels upon signal multiplexing in digital communication for interconnection among digital communications. The SDH is to multiplex modules, each called an STM (Synchronous Transport module), for digital communication. CCITT recommends the use of three kinds of STMs: STM-1 (Synchronous Transport Module Level 1 with a bit rate of 155520 kb/s), STM-4 (Synchronous Transport Module level 4 with a bit rate of 622080 kb/s), and STM-16 (Synchronous Transport Module level 16 with a bit rate of 2488320 kb/s). In cooperation therewith, TTC (Telegraph Telephone Committee) in Japan specifies STM-0 (Synchronous Transport Module level 0 with a bit rate of 51840 kb/s) as a lower level of STM-1. Hereinafter, STM-0, STM-4 or STM-16 is expressed as STM-N and a frame of STM-N is expressed as STM frame.

The STM includes information called SOH (Section Overhead) in addition to data to be communicated. The SOH is comprised of an STM frame synchronizing byte for synchronization between STM frames on the sides of transmission and reception, and of a OW (Order Wire) for delivery of information among nodes.

It is herein noted that prior art radio communication with use of SDH is adapted such that an STM frame is divided into subframes of a predetermined size, to each of which subframes there is added an RFCOH(Radio Frame Complementary Overhead) composed of a radio frame synchronizing bits for synchronization of a radio frame on the sides of transmission and reception and an error control bits for correcting transmission error, and each of which subframes serves as a radio frame for communication.

The prior art communication system includes as described above synchronizing bytes (STM frame synchronizing byte and radio frame synchronizing byte) each for synchronization of the STM frame and of the sizes radio frame, those bytes having no relation to the of the STM frame and the radio frame.

Referring to FIG. 1, there is illusrated a block diagram of a transmitter/receiver apparatus for use in a prior art SDH radio communication system.

A transmitting station serves as follows.

An STM frame synchronization circuit 2A detects STM frame synchronizing byte in an SOH of an STM frame 101A as inputted and issues an STM frame pulse 102A at a timing when the afore-mentioned STM frame synchronizing byte is detected. An STM signal processing circuit 1A extracts the SOH from the STM frame 101A at a timing of the STM frame pulse 102A, and again inserts the SOH into the STM frame 101A after the SOH is subject to a required processing by another circuit not illustrated and issues it as an STM frame 101B.

A radio frame pulse generating circuit 4A frequency-divides a rate converting clock 104A supplied from a rate converting circuit 3A, and issues a radio frame pulse 106A. The rate converting circuit 3A forms in the STM frame 101B empty time slots for the RFCOH on the basis of the radio frame pulse 106A together with rate conversion of the same STM frame 101B, and inserts a predetermined RFCOH into the empty time slots so formed and issues it as a radio frame 107.

A receiving station serves as follows.

A radio frame synchronization circuit 5B detects the radio frame synchronizing bits in the RFCOH of the received radio frame 107, and issues a radio frame pulse 106B at a timing when the radio frame synchronizing bits are detected. A rate converting circuit 3B extracts the RFCOH from the radio frame 107 at a timing of the radio frame pulse 106B, together with the elimination of the time slot for the RFCOH and the rate conversion of the same to issue it as an STM frame 101C.

An STM frame synchronous circuit 2B detects the STM frame synchronizing byte in the SOH of the STM frame 101C, and issues an STM frame pulse 102B at a timing when the STM frame synchronizing byte is detected. A STM signal processing circuit 1B extracts the SOH from the STM frame 101C at the timing of the STM frame pulse 102B, and again inserts the SOH into the STM frame 101C after processing as required the SOH with use of another circuit (not shown) and issues the same as an STM frame 101D.

Additionally, in the prior art system, in the case where the SOH of the STM frame is terminated in an intermediate radio station installed between the transmitting and receiving stations (for example in the case where information set in the OW is extracted), it was done after rate conversion.

In the afore-mentioned prior art SDH radio communication system, it involves bytes in the STM frame and the radio frame for synchronization therebetween (the STM frame synchronizing byte in the SOH and the radio frame synchronizing byte in the RFCOH), and has no relation to the sizes of the STM frame and the radio frame. Accordingly, in the case where the SOH of the STM frame is terminated in the intermediate radio station installed between the transmitting and receiving stations, it requires rate conversion. More specifically, the intermediate station requires a rate converting circuit to result in complicated circuit construction followed by serverely greater power consumption.

Furthermore, in a transmitter/receiver equipment for use in the prior art SDH radio communication system, it adopts double frame synchronizations of those for the STM frame and the radio frame, so that much time is required for the synchronization together with the need of two frame synchronous circuits 2A and 2B to result in complicated circuit construction and severely greater power consumption.

SUMMARY OF THE INVENTION

In view of the drawbacks with the prior art, it is an object of the present invention to simplify the circuit construction of a transmitter/receiver equipment to reduce power consumption. In the case where an intermediate radio station is installed, the present invention has another object to simplify the circuit construction of the intermediate station to reduce power consumption.

To achieve the above objects, an SHD radio communication system according to the present invention, wherein each frame of a synchronous transport modules in SDH (Synchronous Digital Hierarchy) is divided into subframes of a predetermined size, to each of which subframes overhead bits for radio communication is added for communication as a radio frame, is adapted in one aspect such that with the assumption of the number of bits of one frame of said synchronous transport module to be S and the number of bits of one radio frame in said radio communication to be M, said number of bits M of the radio frame is set to satisfy S=K.M (K is a natural number other than 0).

An SHD radio commuincation system of the present invention is adapted such that said overhead bits for radio communication includes no radio communication frame synchronizing bits.

An SDH radio communication transmitter equipment according to the present invention is adapted such that it comprises an STM frame synchronization circuit wherein frames of synchronous transport modules in synchronous digital hierarchy are inputted, and an STM frame synchronizing byte in a section overhead of a frame of said synchronous .transport module is detected, and further an STM frame pulse is issued at a timing when said STM frame synchronizing byte is detected, an STM signal processing circuit for extracting the section overhead from the frame of said synchronous transport module based upon the timing of said STM frame pulse and inserting the section overead into the frame of said synchronous transport module, a radio frame multiplying circuit for multiplying the frequency of said STM frame pulse by K (a natural number other than 0) and issuing a radio frame pulse at a timing K times the timing of the STM frame pulse, and a rate converting circuit for inserting the radio communication overhead bits into the frame of said synchronous transport module to alter it to a radio frame and performing rate conversion of the just-mentioned radio frame.

An SDH radio communication receiver equipment according to the present invention is adapted in one aspect such that it comprises an STM frame synchronization circuit for receiving radio frames of SDH radio communication, and detecting an STM frame synchronizing byte in a section overhead of each frame of a synchronous transport module in synchronous digital hierarchy in said radio frame, a radio frame multiplying circuit or multiplying the frequency of said STM frame pulse by (a natural number other than 0) to issue a radio frame pulse at a timing K times the timing of said STM frame pulse, a rate converting circuit for extracting the radio commuincation secion overhead having no radio comunication frame synchronizing bits from said radio frame based upon the timing of said radio frame pulse as a frame of the synchronous transport module and performing rate conversion of the frame of said synchronous transport 10 module, and an STM signal processing circuit for extracting the section overhead from said synchronous tarnsport module based upon the timing of said STM frame pulse and inserting the section overhead of said synchronous transport module.

An SDH radio cmmunication receiver equipment of the present invention is adapted in another aspect such that it further comprises the SDH radio communication transmitter equipment as recited in the foregoing and the SDH radio communication receiver equipment recited in the foregoing.

The SDH radio communication transmitter equipment of the present invention recited in the foregoing is adapted in another aspect such that the radio comunication overhead bits which is inserted into the frame of the synchronous transport module in said rate converting circuit has no radio communication frame synchronizing bits.

The SDH radio receiver equipment of the present invention recited in the foregoing is adapted in another aspect such that the radio frame inputted in said STM frame synchronization circuit has no radio communication frame synchronizing bits in the radio communication overhead bits of said radio frame. An SDH radio communication transmitter/receiver equipment of the present invention comprises the SDH radio communication transmitter apparatus recited in the foregoing and the SDH radio communication receiver equipment recited in the foregoing.

An SDH radio communication intermediate station equipment according to the present invention comprises a radio frame demultiplexing circuit for receiving thereby radio frames of such SDH radio communication that there is satisfied a relationship S=K.M (K is a natural number other than 0) between the bit number M of one radio frame in the radio communication and the bit number S of one frame of a synchronous transport module in synchronous digital hierarchy S with the assumption of the bit number of said one frame of the synchronous transport module to be S and the bit number of said one radio frame in the radio communication to be M, and for detecting a radio frame snchronizing bits in a radio communication overhead bits in said radio frame, and further separating the radio communication overhead from said radio frame in the timing of said detection and issuing the same as a synchronous transport module signal as well as issuing a radio frame pulse in the timing of said detection, an SOH terminating circuit for ignoring a time slot for said radio communication overead bits in said synchronous transport module signal on the basis of said radio frame pulse and detecting the STM frame synchronizing byte in the section overhead of said synchronous transport module signal, and further terminating the section overhead of said synchronous transport module signal at the timing of said detection, and a radio frame multiplexing circuit for inserting a predetermined radio communication overhead into a time slot for the radio communication overhead in said synchronous transport module based upon said radio frame pulse and outputting it as a radio frame.

In accordance with the SDH radio communication system of the present invention wherein each frame of the synchronous transport module in the synchronous digital hierarchy is divided into subframes of a predetermined size, to each of which subframes a radio communication overhead bits is added for communication as a radio frame, the bit number M of one radio frame in the radio communication is set to satisfy the relation S=K.M (K is a natual number other than 0) with the assumption of the bit number of the one frame of the synchronous transport module to be S and the bit number of one radio frame in radio communication to be M.

In accordance with the present invention, the bit number of the one radio frame in radio communication is set to satisfy the relation S=K.M (K is a natural number other than 0) with the assumption of the bit number of the one frame of the synchronous transport module and the bit number of the one radio frame in the radio communication to be M, so that construction of the SDH radio communication transmitter/receiver equipment is simplified.

The above and other objects, features and advantages of the present invention will become more apparent from the following description when taken in conjunction with the accompanying drawings in which preferred embodiments of the present invention are shown by way of illustrative examples.

DETAILED DESCRIPTION OF THE PREFERRED EMBODIMENT

In what follows, a preferred embodiment of the present invention will be described with reference to the accompanying drawings.

Figure 2A:
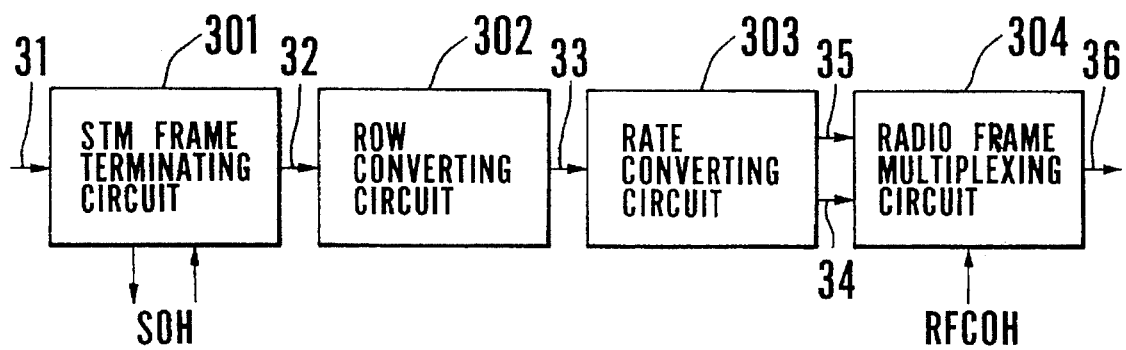
FIG. 2A is a block diagram illustrating a transmitting terminal station in a first embodiment with use of a SDH radio communication system according to the present invention.
Figure 2B:
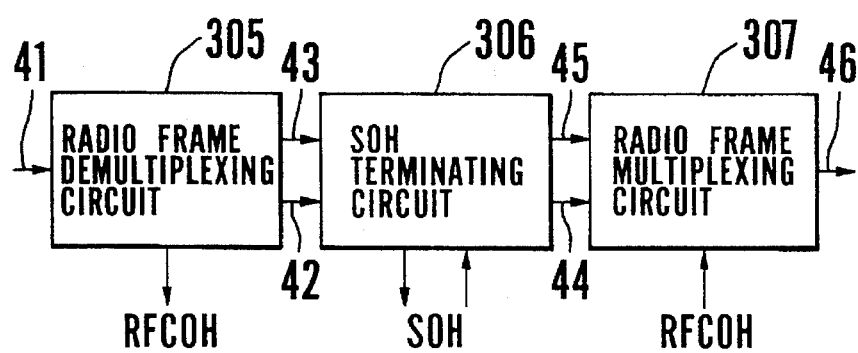
FIG. 2B is a block diagram illustrating an intermediate station in the same embodiment.
Figure 2C:
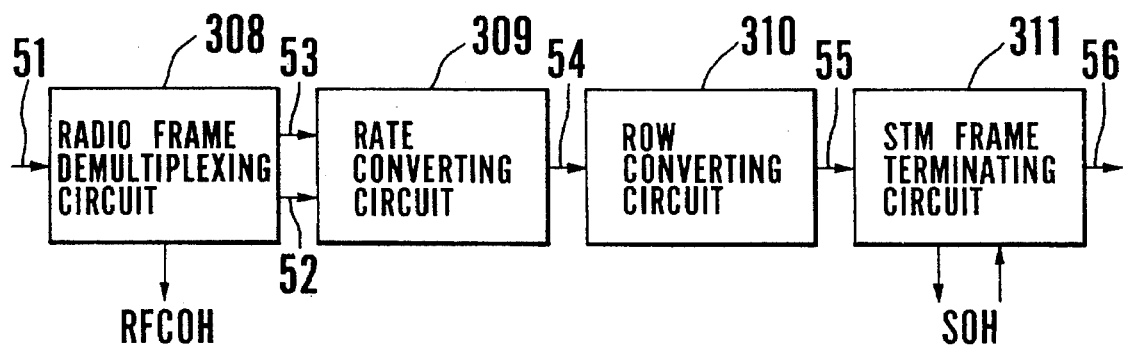
FIG. 2C is a block diagram illustrating a receiving terminal station in the same embodiment.

Referring to FIGS. 2A to 2C, there are illustrated in block diagrams a transmitting terminal station, an intermediate station, and a receiving terminal station in a first embodiment with use of an SDH radio communication system according to the present invention.

The transmitting terminal station will first be described.

As illustratd in FIG. 2A, an STM frame terminating circuit 301 detects a STM frame synchronizing byte in SOH of an STM frame 31 as inputted, and extracts the SOH from the STM frame 31 in the timing of the detection, and further again inserts the SOH into the STM frame 31 after processing the SOH as required with another circuit not illustrated and outputs it as an STM frame 32.

A row converting circuit 302 converts the STM frame 32 to an "n" row signal of a $2^n$ modulation system for radio communication system, and outputs a converted "n" row STM signal 33.

A rate converting circuit 303 adds an empty time slot for RFCOH into the STM signal 33 for rate conversion such that there is satisfied a relation S=K.M (K is a natural number other than 0) with the assumption of the number of bits in one STM frame to be S bits and the number of bits in one radio frame to be M bits. More specifically, the rate converting circuit 303 outputs the rate converted STM signal 34 after the data signalling rate conversion and issues a radio frame pulse 35 at the timing of the empty time slot for RFCOH.

A radio frame multiplexing circuit 304 inserts RFCOH into the empty time slot in the rate converted STM signal 34 based upon the radio frame pulse 35, and issues a radio frame 36.

Successively, the intermediate station will be described.

As illustrated in FIG. 2B, a radio frame demultiplexing circuit 305 detects a radio frame synchronizing bits in RFCOH of a radio frame 41 received from the transmitting terminal station or another intermeiate station, and issues an STM signal 42 in the timing of the detection after separating the RFCOH from the radio frame 41, and further issues a radio frame pulse 43 in the timing of the detection of the radio frame synchronizing bits in the RFCOH. It is noted herein that the STM signal 42 includes the time slot for RFCOH left intact.

An SOH terminating circuit 306 ignores the time slot for RFCOH in the STM signal 42 based upon the radio frame pulse 43, and detects the STM frame synchronizing byte in the SOH of the STM signal 42 using a relation that satisfies the expression S=K.M (K is a natural number other than 0) with the assumption of the number of bits in of the one STM frame to be S bits and the bit number of bits the one radio frame to be M bits, and further terminates the SOH of the STM frame in the timing of the just-mentioned detection and extracts infomation set to the OW as an example in the SOH. The SOH terminating circuit 306 further issues an STM signal 44 which is a signal where OW information is updated with respect to the SOH in the STM signal 42, and issues a radio frame pulse 45 in the timing of the time slot for RFCOH of the STM signal 44.

A radio frame multiplexing circuit 307 inserts RFCOH into the time slot for the RFCOH of the STM signal 44 based upon the radio frame pulse 45.

Finally, the receiving terminal station will be described.

As illustrated in FIG. 2C, a radio frame demultiplexing circuit 308 detects a radio frame synchronizing bits in RFCOH of a radio frame 51 received from the transmiting terminal station and outputs an STM signal 52 in the timing of the detection after separating the RFCOH from the radio frame 51 and further issues a radio frame pulse 53 in the timing of the detection of the radio frame synchronizing bits in the RFCOH. The STM signal 52 includes the time slot for the RFCOH left intact.

A rate converting circuit 309 eliminates the time slot for the RFCOH from the STM signal 52 on the basis of the radio frame pulse 53, and outputs an STM signal 54 (i.e., "n" row) after the rate conversion.

A row converting circuit 310 converts the "n" row STM signal 54 to a one row STM frame 55.

An STM frame terminating circuit 311 detects a STM frame synchronizing byte in SOH of the STM frame 55, and extracts the SOH from the STM frame 55 in the timing of the detection, and again inserts the SOH into the STM frame 55 after processing the SOH as required with another circuit not illustrated and issues the same to a later stage circuit as a STM frame 56.

It should be noted that although in the present embodiment there were described as one row the input and output for the terminating of the STM frame, the present invention is not limited thereto and there is also possible other processings with other row numbers.

Successively, there will be described a second embodiment with use of the SDH radio communication system according to the present invention.

Figure 3:
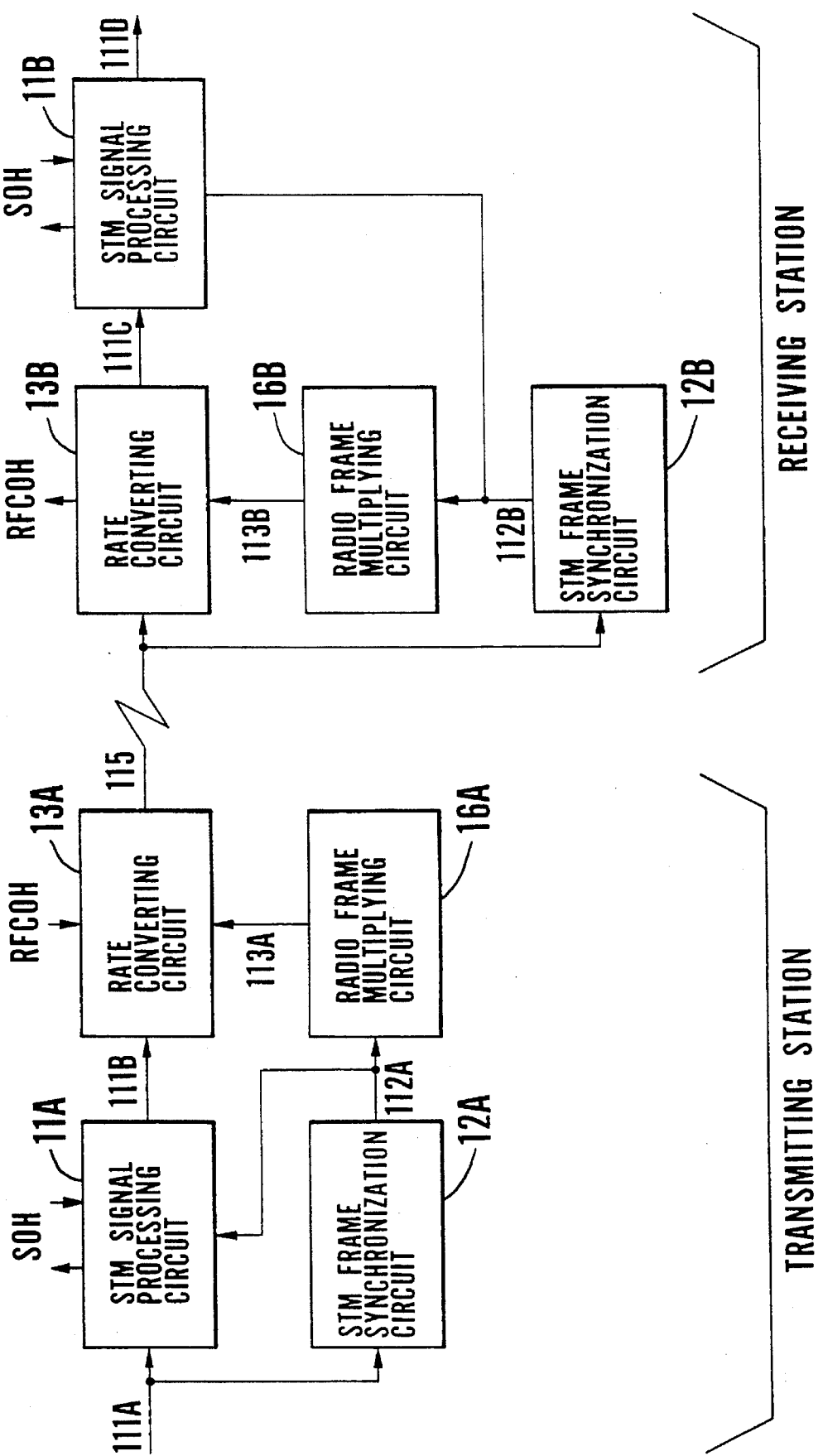
FIG. 3 is a block diagram illustrating a transmitter/receiver equipment for use in an SDH radio communication system as a second embodiment of the present invention.

Referring to FIG. 3, there is illustrated in a block diagram a transmitter/receiver equipment for use in the SDH radio communication system of the present invention.

Figure 4:
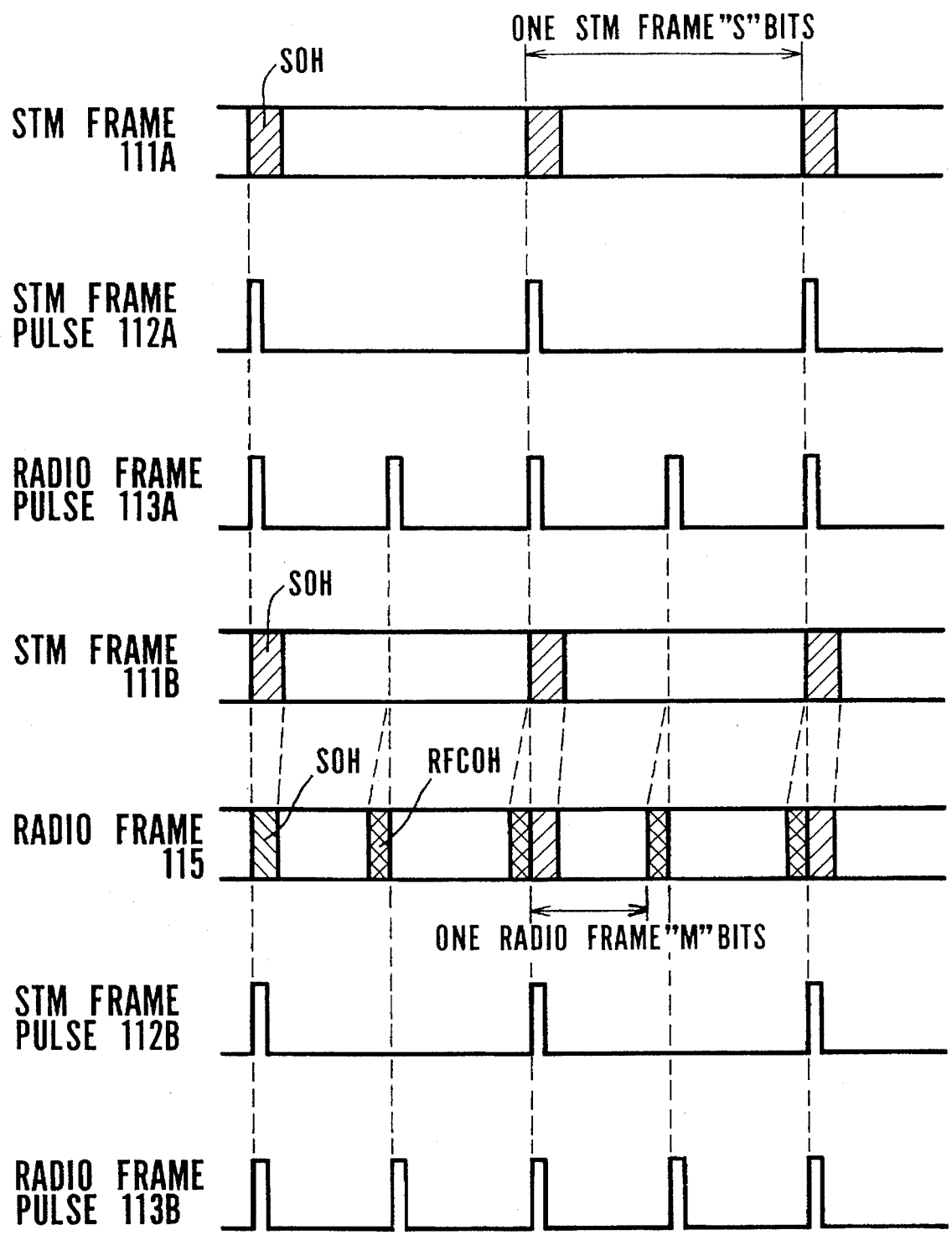
FIG. 4 is a view illustrating a signal format in the transmitter/receiver equipment illustrated in FIG. 3.

Referring further to FIG. 4, there is illustrated a signal format in the transmitter/receiver equipment illustrated in FIG. 3.

There will first be described the transmitting station.

As illustrated in FIG. 3, an STM frame synchronization circuit 12A detects an STM frame synchronzing byte in SOH of an STM frame 111A as inputted, and issues an STM frame pulse 112A in the timing of the detection. The format of the STM frame 111A and the timing of the STM frame pulse 112A are as illustrated in FIG.4, and in the present embodiment the number of bits in one STM frame is assumed to be S bits.

An STM signal processing circuit 11A extracts the SOH from the STM frame 111A in the timing of the STM frame pulse 112A, and again inserts the SOH into the STM frame 111A after processing the SOH as required with another cicuit not illustrated and outputs the same as an STM frame 111B. The format of the STM frame 111B is illustrated in FIG. 4.

A radio frame multiplying circuit 16A issues a radio frame pulse 13A of a frequency K times (K is a natural number other than 0) that of the STM frame pulse 112A. The timing of the radio frame pulse 113A is as illustrated in FIG. 4 which illustrates a case where K is 2.

A rate converting circuit 13A performs preparation of an empty time slot for RFCOH and rate conversion with respect to the STM frame 111B on the basis of the radio frame pulse 113A, and inserts predetermined RFCOH into the empty time slot and outputs the same as a radio frame 115. In the present embodiment, the inserted RFCOH is set to include no radio frame synchronizing bits.

The format of the radio frame 115 is illustrated in FIG. 4. In the present embodiment, as understood from FIG. 4, the rate conversion is done such that the bit rate of the radio frame 115 is faster than that of the STM frame 111B by a fraction of the added RFCOH. Further, since the multiple K in the radio frame multiplying circuit 16A is set to be 2, a relation S=2.M holds between the bit number M of the radio frame 115 and that S of the STM frame 111A.

Next, the receiving station will be described.

A STM frame synchronization circuit 12B detects an STM frame synchronizing byte in SOH of the received radio frame 115, and issues an STM frame pulse 112B in the timing of the detection. The timing of the STM frame pulse 112B is as illustrated in FIG. 4.

A radio frame multiplying circuit 16B issues a radio frame pulse 113B of a frequency K times (K is a natural number other than 0) that of the STM frame pulse 112B. The timing of the radio frame pulse 113B is as illustrated in FIG.4 where K is 2.

A rate converting circuit 13B matches the phase of the radio frame pulse 113B with that of a clock of the radio frame 115 and thereafter extracts the RFCOH from the radio frame 115 in the timing of the radio frame pulse 113B, and performs elimination of the timing slot for the RFCOH and rate conversion and thereafter outputs it as an STM frame 111C.

An STM signal processing circuit 11B extracts the SOH from the STM frame 111C in the timing of the STM frame pulse 112B, and again inserts the SOH into the STM frame 111C after editing the SOH with another circuit not illustrated and outputs it to a later stage circuit as an STM frame 111D.

Successively, there will be described in further detail the consruction of the second embodiment described above with reference to FIG. 5.

Figure 5:
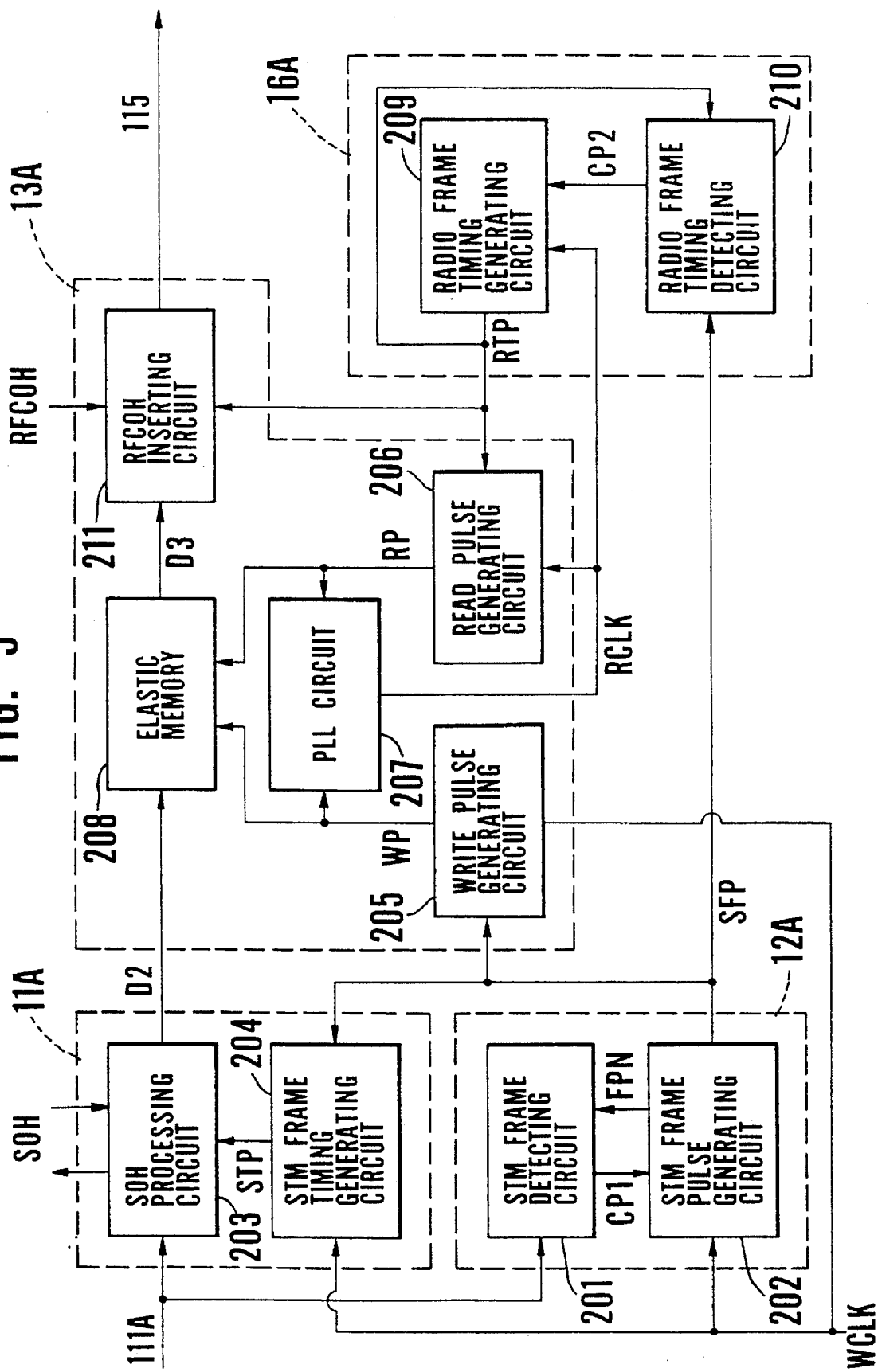
FIG. 5 is a detailed block diagram illustrating a transmitting station of the transmitter/receiver equipment for use in the SDH radio communication system of the present invention illustrated in FIG. 3.

Referring to FIG. 5, the details of the transmitting station is illustrated in the block diagram of the transmitter/receiver apparatus for use in the SDH radio communication system of the present invention illustrated in FIG. 3.

An STM frame synchronization circuit 12A of FIG. 3 is comprised of an STM frame pulse generating circuit 202 and an STM frame detecting circuit 201.

An STM frame pulse generating circuit 202 frequency-divides an input clock WCLK to prepare an STM frame pulse SFP of the same frequency as a frame width of the STM frame, and prepares an STM frame synchronizing byte pattern FPN in synchronism with the STM frame pulse SFP.

An STM frame detecting circuit 201 detects the STM frame synchronizing byte in the SOH of the STM frame 111A by comparing the STM frame 111A as inputted with the STM frame synchronizing byte pattern FPN. The STM frame detecting circuit 201 feeds a control signal CP1 to the STM frame pulse generatng circuit 202 continuouslly until the detection of the STM frame synchronizing byte.

The STM frame pulse generating circuit 202 shifts the STM frame pulse SFP in its phase once receiving the control signal CP1, and issues thereby an STM frame pulse SFP in synchronism with the STM frame synchronizing byte in the SOH of the STM frame 111A.

Figure 1:
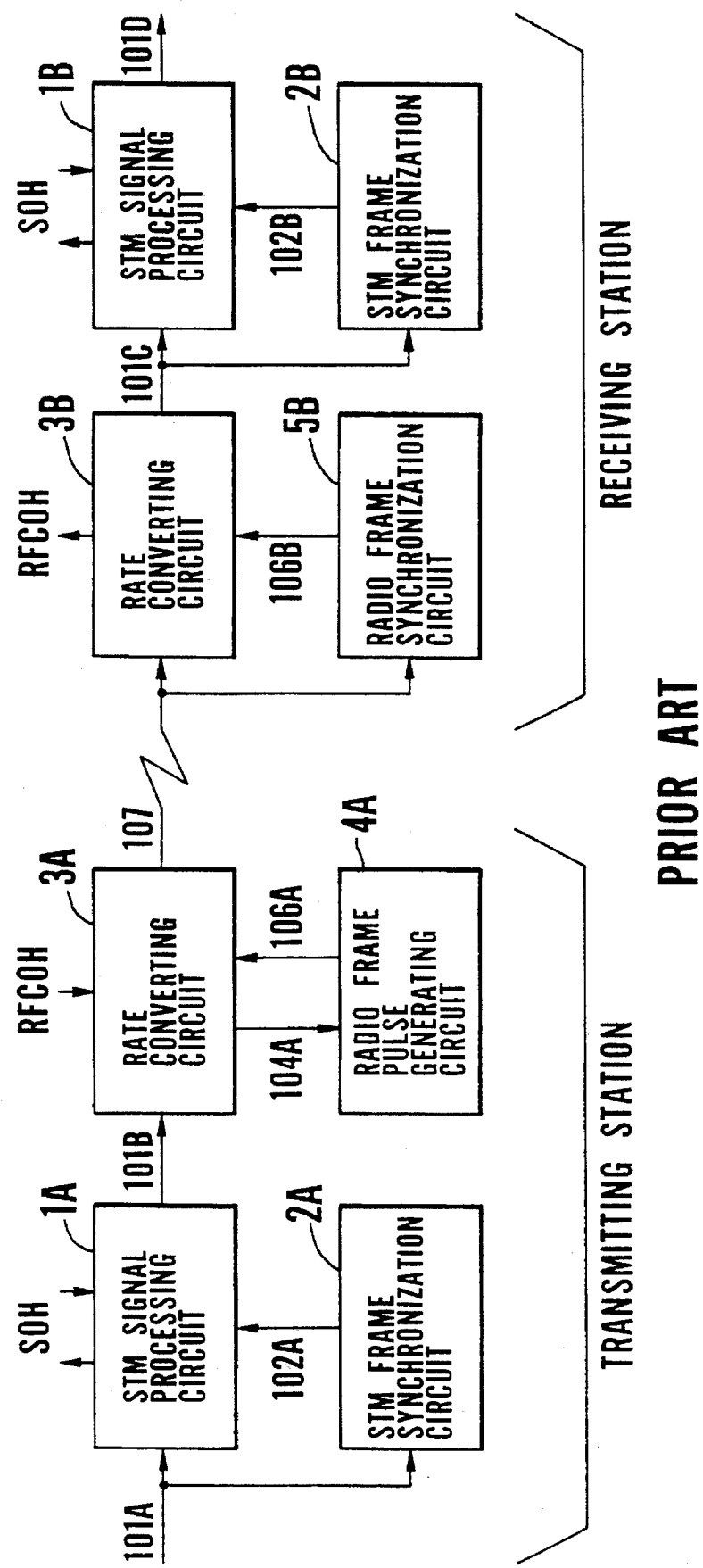
FIG. 1 is a block diagram illustrating a transmitter/receiver equipment for use in a prior art SDH radio communication system.

The STM signal processing circuit 11A of FIG. 1 is comprised of an SOH processing circuit 203 and an STM frame timing generating circuit 204.

The STM frame timing generating circuit 202 shifts the STM frame pulse SFP from the STM frame pulse generating circuit 202 in its phase, and issues an SOH timing pulse STP in synchronism with the head of the SOH of the STM frame 111A. The SOH processing circuit 203 extracts the SOH from the STM frame 111A on the basis of the foregoing SOH timing pulse STP, and again inserts the SOH into the STM frame 111A after editing the SOH in another circuit not illustrated and outputs it as a STM frame D2.

The rate converting circuit 13A of FIG. 3 is comprised of an elastic memory 208, a write pulse generating circuit 205, a read pulse generating circuit 206, a PLL circuit 207, and a RFCOH inserting circuit 211.

A write pulse generating circuit 205 frequency-divides an input clock WCLK based upon the STM frame pulse SFP to issue a write pulse WP.

The read pulse generating circuit 206 interrupts delivery of the result of frequency division of a clock RCLK after rate conversion of the same with use of a RFCOH timing pulse RTP prepared in a radio frame timing generating circuit 209, and issues a read pulse RP of the same frequency as that of the write pulse WP.

The PLL circuit 207 issues the clock RCLK after the rate conversion using the write pulse WP and the read pulse RP as an input for phase comparison.

The elastic memory 208 executes rate conversion of the empty time slot for the RFCOH by writing in a memory the STM frame D2 from the SOH processing circuit 203 in the timing of the write pulse WP and reading the same from the memory in the timing of the read pulse RP, and outputs a radio frame D3 where an empty time slot for RFCOH prepared and rate-converted.

The RFCOH inserting circuit 211 inserts RFCOH into the empty time slot for the RFCOH of the radio frame D3 on the basis of the RFCOH timing pulse RTP, and issues it as a radio frame 115.

The radio frame multiplying circuit 16A of FIG. 3 is comprised of a radio frame timing generating circuit 209 and a radio frame timing detecting circuit 210.

The radio frame timing generating circuit 209 frequency-divides the clock RCLK after rate conversion, and issues a RFCOH timing pulse RTP of the same period as that of the radio frame and ouputs it to the radio frame timing detecting circuit 210.

The radio frame timing detecting circuit 210 prepares a reference pulse of the same phase as that of the STM frame pulse SFP but of the frequency K times as that of the same (K is a natural number other than 0), and compares the RFCOH timing pulse RTP with the reference pulse and feeds a control signal CP2 to the radio frame timing generating circuit 209 until coincidence of the comparison is attained.

59

The radio frame timing generating shifts the RFCOH timing pulse RTP in its phase once receiving the control signal CP2 and thereby issues the RFCOH timing pulse RTP in synchronism with the location of the RFCOH empty time slot of the radio frame D3.

The detailed description was made of the transmitting station, and the same shall be applied also to the receiving station, which is therefore omitted herein.

According to the present invention, as described above, the radio frame was constructed such that the number of bits M of one STM frame satisfy a relation S=K.M (K is a natural number other than 0). Accordingly, in the case where the SOH of the STM frame is terminated in the intermediate station, the need of a rate converting circuit is eliminated together with the simplification of the circuit constrcution of the intermediate station and together with the reduction of consumed power.

Further, synchronization is established for the radio frame and for the STM frame using the STM frame synchronizing byte in the SOH of the STM frame. Accordingly, only one frame synchronization circuit is simply required and the radio frame pulse is generated only with a simplified multiplying circuit. Thus, the circuit construction of the transmitter/receiver equipment is simplified and power consumption is reduced. Moreover, the frame synchronization is simply required only once, and hence frame alignment for synchronization time is reduced. Additionally, there is no need of providing a radio frame synchronizing bits in the RFCOH (an overhead of a radio frame), so that temporal bandwidth of radio communication is narrowed and interference between adjacent waves is reduced.

What is claimed is:

1. An SDH (Synchronous Digital Hierarchy) radio communication system, wherein a frame of synchronous transport module in SDH is divided into subframes of a predetermined size, to each of which subframes overhead bits for radio communication are added for communication as a radio frame wherein said overhead bits for radio communication include no radio communication frame synchronizing bits, said system characterized in that the number of bits of one frame of said synchronous transport module is S and the number of bits of one radio frame in said radio communication is M, said number of bits M of the radio frame is set to satisfy a relation S=K.M, where K is a natural number other than 0.

2. An SDH (Synchronous Digital Hierarchy) radio communication transmitter equipment comprising:

an STM frame terminating circuit wherein frames of synchronous transport modules in synchronous digital hierarchy are inputted, an STM frame synchronizing byte in a section overhead of a frame of a synchronous transport module is detected, said section overhead is extracted from the frame of said synchronous transport module at a timing of the detection of the STM frame synchronizing byte, a predetermined section overhead is inserted into the frame of said synchronous transport module at a timing of the detection and further an STM frame pulse is issued at a timing of the detection;

a row converting circuit for converting the frame of said synchronous transport module from said STM frame terminating circuit to an "n" row signal of a $2^n$ modulation system for a radio communication system;

a rate converting circuit for adding for rate conversion an empty time slot for RFCOH to a signal from said row converting circuit so that a relation S=K.M is satisfied, where the number of bits of one STM frame is S, and the number of bits of one radio frame is M, and K is a natural number other than 0, and then outputting radio frame pulses at a timing of said empty time slots; and a radio frame multiplexing circuit for inserting a predetermined radio communication overhead into empty time slots of a signal from said rate converting circuit at a timing of said radio frame pulse and outputting a radio frame.

3. An SDH (Synchronous Digital Hierarchy) radio communication receiver equipment comprising:

a radio frame demultiplexing circuit for receiving a radio frame of SDH radio communication wherein a relation of S=K.M, where K is a natural number other than 0, is satisfied where the number of bits of one frame of a synchronous transport module in SDH being S and the number of bits of one radio frame in said radio communication being M, detecting radio frame synchronizing byte in a radio communication overhead of said radio frame, separating said radio communication overhead from said radio communication frame at a timing of the detection of said radio frame synchronizing byte and outputting a signal after separation and a radio frame pulse at a timing of the detection;

a rate converting circuit for eliminating time slots of said radio communication overhead in said signal after separation, smoothing and converting a rate of the smoothed signal;

a row converting circuit for converting a rate-converted signal from said rate converting circuit which is an "n" row signal of a $2^n$ modulation system for a radio communication system into frames of synchronous transport modules, where "n" is a positive integer; and an STM frame terminating circuit wherein frames of synchronous transport modules from said row converting circuit are inputted, an STM frame synchronizing byte in a section overhead of a frame of said synchronous transport module is detected, said section overhead is extracted from the frame of said synchronous transport module at a timing detection of the STM frame synchronizing byte, a predetermined section overhead is inserted into the frame of said synchronous transport module at a timing of the detection.

4. An SDH radio communication transmitter/receiver equipment comprising the SDH radio communication transmitter equipment as claimed in claim 2 and the SDH radio communication receiver equipment as claimed in claim 3.

5. An SDH (Synchronous Digital Hierarchy) radio communication intermediate station comprising:

a radio frame demultiplexing circuit for receiving radio frames of SDH radio communication wherein a relation S=K.M is satisfied where the number of bits of one radio frame in the radio communication is M, the number of bits of one frame of a synchronizing transport module in synchronous digital hierarchy is S, and K is a natural number other than 0, said radio frame demultiplexing circuit detecting a radio frame synchronizing bits in a radio communication overhead in said radio frame, separating the radio communication overhead from said radio frame at a timing of said detection and outputting a signal with no radio communication overhead as well as a radio frame pulse at a timing of said detection;

an SOH terminating circuit for ignoring a time slot for said radio communication overhead in said signal with no radio communication overhead on the basis of the timing of said radio frame pulse, said signal with no radio communication overhead has a section overhead having an STM frame synchronization byte, said SOH terminating circuit detecting said STM frame synchronizing byte, extracting said section overhead from said signal with no radio communication overhead at a timing of said detection and inserting a predetermined section overhead in said signal with no radio communication overhead at a timing of said detection; and a radio frame multiplexing circuit for inserting a predetermined radio communication overhead into a time slot of the radio communication overhead in said signal based upon the timing of said radio frame pulse and outputting a radio frame.

6. A SDH radio communication transmitter equipment comprising:

an STM frame synchronization circuit wherein frames of a synchronous transport module in synchronous digital hierarchy are inputted, and an STM frame synchronizing byte in a section overhead of a frame of said synchronous transport module is detected, and an STM frame pulse is outputted at a timing of the detection of said STM frame synchronizing byte;

an STM signal processing circuit for extracting said section overhead from the frame of said synchronous transport module based upon the timing of said STM frame pulse and inserting a predetermined section overhead into the frame of said synchronizing transport module;

a radio frame multiplying circuit for multiplying the frequency of said STM frame pulse by K, where K is a natural number other than 0, and outputting a radio frame pulse at a timing of the STM frame pulse; and a rate converting circuit for providing an empty time slot for a radio communication overhead in an output signal coming from said STM signal processing circuit in response to said radio frame pulse, inserting the radio communication overhead into the empty time slot of said output signal and converting a rate of the output signal with said radio communication overhead, thereby outputting a radio frame.

7. An SDH (Synchronous Digital Hierarchy) radio communication receiver equipment comprising:

an STM frame synchronization circuit for receiving a radio frame of SDH radio communication wherein a relation of S=K.M, where K is a natural number other than 0, is satisfied with the assumption of a bit number of one frame of a synchronous transport module in SDH being S and a bit number of one radio frame in said radio communication being M, detecting STM frame synchronizing byte in a section overhead of said radio frame of the synchronous transport module in SDH, and outputting an STM frame pulse at a timing of the detection;

a radio frame multiplying circuit for multiplying the frequency of said STM frame pulse by K, where K is a natural number other than 0, and outputting a radio frame pulse at a timing of the STM frame pulse;

a rate converting circuit for extracting a radio communication overhead from said radio frame based on the timing of said radio frame pulse, eliminating said overhead and performing rate conversion of a signal with the overhead eliminated; and an STM signal processing circuit for extracting said section overhead from a signal from said rate converting circuit based on the timing of said STM frame pulse, inserting a predetermined section overhead into said signal from said rate converting circuit and outputting a frame of synchronous transport module.

8. An SDH (Synchronous Digital Hierarchy) radio communication transmitter/receiver equipment comprising the SDH radio communication transmitter equipment as claimed in claim 6 and the SDH radio communication receiver equipment as claimed in claim 7.

9. An SDH radio communication transmitter equipment according to claim 6 wherein the radio communication overhead which is inserted into the signal from said STM signal processing circuit in said rate converting circuit has no radio communication frame synchronizing bits.

10. An SDH radio receiver equipment according to claim 7 wherein the radio communication overhead of said radio frame which is inputted in said STM frame Synchronization circuit has no radio communication frame synchronizing bits.

11. An SDH radio communication transmitter/receiver equipment comprising the SDH radio communication transmitter equipment as claimed in claim 9 and the radio communication receiver equipment as claimed in claim 10.

* * * * *